United States Patent [19]

Gordon

[11] Patent Number: 4,831,233
[45] Date of Patent: May 16, 1989

[54] OPTICALLY CONTROLLED WELDING SYSTEM

[75] Inventor: Stephen S. Gordon, Moorpark, Calif.

[73] Assignee: The United States of America as represented by the Administrator of the National Aeronautics and Space Administration, Washington, D.C.

[21] Appl. No.: 250,196

[22] Filed: Sep. 28, 1988

[51] Int. Cl.$^4$ ............................................... B23K 9/12
[52] U.S. Cl. ........................... 219/124.34; 219/130.01; 901/42; 901/47
[58] Field of Search ...................... 219/124.34, 130.01, 219/130.21; 901/42, 47

[56] References Cited

U.S. PATENT DOCUMENTS

| | | | |
|---|---|---|---|
| 4,578,561 | 3/1986 | Corby, Jr. et al. | 219/124.34 |
| 4,667,082 | 5/1987 | Shibata et al. | 219/124.34 |
| 4,711,986 | 12/1987 | Lillquist et al. | 219/130.01 |
| 4,767,911 | 8/1988 | Maram et al. | 219/130.01 |

Primary Examiner—Clifford C. Shaw
Attorney, Agent, or Firm—William J. Sheehan; John R. Manning; Charles E. B. Glenn

[57] ABSTRACT

An optically controlled welding system (10) wherein a welding torch (12) having through-the-torch viewing capabilities is provided with an optical beam splitter (56) to create a transmitted view and a reflective view of a welding operation. These views are converted to digital signals which are then processed and utilized by a computerized robotic welder (15) to make the welding torch responsive thereto. Other features includes an actively cooled electrode holder (26) which minimizes a blocked portion of the view by virtue of being constructed of a single spoke or arm (28) and a weld pool contour detector (14) comprising a laser beam directed onto the weld pool with the position of specular radiation reflected therefrom being characteristic of a penetrated or unpenetrated condition of the weld pool.

20 Claims, 2 Drawing Sheets

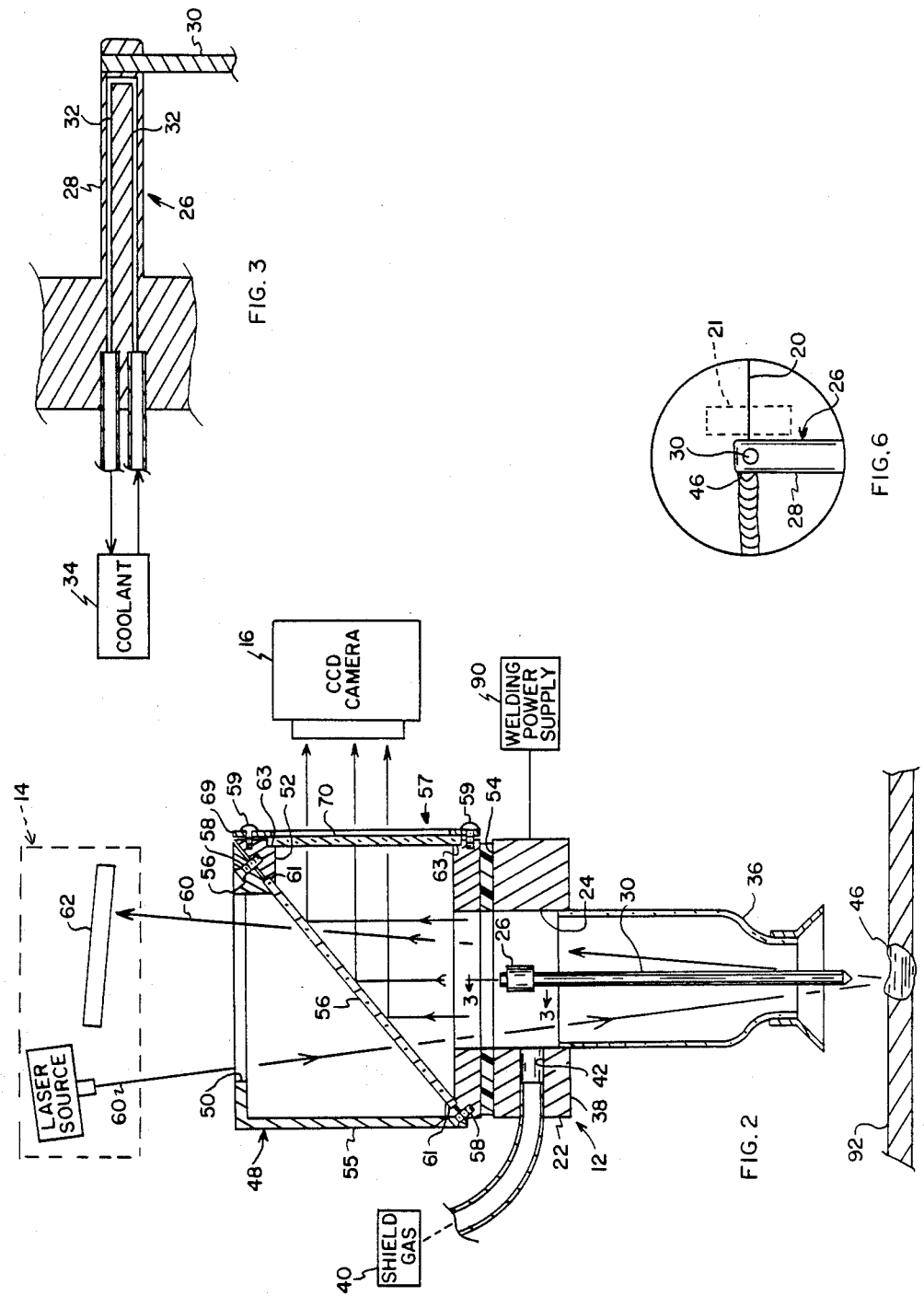

OPTICALLY CONTROLLED WELDING SYSTEM

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

TECHNICAL FIELD

This invention relates generally to welding torches and more particularly to a gas tungsten arc welding (GTAW) torch having an opening extending therethrough, with a welding electrode coaxially mounted in this opening. An optical beam splitter is positioned over this opening and provides a pair of views of the welding operation, which in turn are coupled to a seam tracking device and a weld pool contour detecting device. These devices provide inputs to a robotic welding apparatus which directs the welding torch.

BACKGROUND OF THE INVENTION

As the process of arc welding is perhaps one of the most widely used manufacturing processes in the world, great efforts have been made in the last few years to automate the process by using optically controlled robotic welders. This is especially advantageous from the standpoint of increased productivity and the ability to make uniform, high-quality welds.

In order to automatically control the welding process, it is necessary to measure and determine certain parameters of the weld pool as well as determining where the weld seam is so as to guide the welding torch thereover. In the past, only the welder has been able to view the arc length and the weld pool contour and to adjust the torch accordingly to achieve optimum penetration of the weld. Additionally, the welder is in a position to readily track the sometimes irregular weld preparations or joints.

Early attempts have been made to automatically track weld preparation areas by use of sensors which look ahead of the welding torch. Such sensors attempt to discern where the weld preparation area or joint is and adjust the movement of the welding torch so as to coincide therewith. Such methods have utilized both direct contacting type sensors, which are dragged through the weld preparation area ahead of the welding torch, and by indirect measurement techniques, such as the use of infrared detectors.

In recent years, video equipment has been used to attempt to monitor the welding operation. These methods entail positioning a television camera to obliquely view a welding operation, which yields a view similar to what a welder would see. Such a view of the welding process has the inherent problem of viewing a very bright welding arc, which tends to "wash out" the view unless appropriate filters are utilized. These filters limit the view of the camera to one or several wavelengths of light rather than the broad spectrum available from the arc. Problems of obliquely viewing the welding operation with a video camera are that unforeseen obstructions to the camera in real welding situations arise. Such obstructions can be caused by the welding preparation geometry and by constraints on the placement of the camera. Also, parallax distortions of the image of the weld puddle are caused by the oblique viewing position. These problems are in addition to the over-exposure problems caused by direct arc viewing as described above.

As is known, a relationship exists between the actual contour of the molten pool and the penetration being achieved by the welding process. Thus, it is desirable to be able to directly measure and control the weld pool contour. Precise control of the weld puddle contour produces a correspondingly precise control of penetration being achieved by the welding process. Prior methods of analysis of video data from the arc and weld pool area have made the assumption that the bright areas represent reflections from the weld pool, and that once the light intensity has decreased to a certain value, then the edge of the weld pool has been approached. Such methods employ a binary go/no go logic system to establish the weld pool width. Unfortunately, oscillations of the size and contour of the weld pool exist due to fluctuations in arc voltage, addition of filler wire, and forward motion of the electrode along the weld preparation area. Such oscillations cause the area of brightness to vary considerably. Attempts to mitigate this error are simply corrections of the data rather than actual measurement and evaluation of the true weld pool contour.

Perhaps the biggest problem involved with providing reliable control of the welding process is seam tracking. Sensors which measure the precise location of the welding seam have been used with limited success. Unfortunately, in order to avoid damage to the sensor and also to keep the sensor from being obscured by the arc area and the molten metal, it has been necessary to sense the seam some distance ahead of the welding torch. This immediately produces the requirement of having some delay in system response so that the system response to seam tracking occurs at the time when the welding head is over the area of change.

Seam tracking devices have been of two types. First are those that use the arc itself as the sensor. Sensors of this type sense voltage and current variations of the arc when the various surface features of the base metal are encountered. One such method oscillates the arc back and forth across the seam while measuring voltage changes as the arc gets longer as it approaches the weld preparation. Various schemes have been proposed to allow for this oscillation. Both magnetic and mechanical motion devices have been utilized previously. The second method is the direct arc viewing method for seam tracking at the point of welding. Here, the methods identify the edges of the weld preparation or weld groove from analyses of light from the arc reflected off the edges from the grooves or side walls of the weld preparation area. A feedback system is then provided to respond to the reflected light to produce the desired effect of following the seam to be welded. As mentioned, the problems of tracking the weld seam or weld preparation area by viewing the area ahead of the weld require that any information thus received be delayed before it is implemented so that the welding torch is indeed over the area detected, or the change detected, at the time the change instruction or signal is initiated. Also, any process control data, whether it be used for seam tracking or for viewing welding parameters in the area of the arc in the molten pool, are subject to error due to parallax from the oblique view of the camera positions known in prior art and the undesirable masking of the far side of the weld pool by the arc itself.

Attempts to overcome the problem of positioning a camera to obliquely view a welding operation have resulted in an apparatus disclosed in U.S. Pat. No. 4,532,408 (Richardson). This patent discloses a welding torch having a through the torch viewing system which provides a view of the welding operation which is coaxial with the welding electrode. This allows the electrode to block the intensely bright light from the welding arc. This view may be coupled to a video picture analyzer, which may then be used to control a robotic welder. Alternately, this view may be coupled to a monitor, which in turn is observed by an operator who can control the welding operation from a remote location.

Problems with this method are that only one view is provided to control the welding operation. In order to adequately control a welding operation by use of optically controlled robotics, it is believed that at least two views of the welding operation are needed. One view would be coupled to a seam tracking analyzer to track the welding electrode along the weld preparation area, while the second view would be utilized by weld pool monitoring equipment, which monitors parameters of the weld pool and determines penetration of the weld.

Accordingly, it is an object of this invention to provide a welding torch equipped with a beam splitter which provides a reflected view and a transmitted view of the welding operation. These views are coaxial with the welding electrode, and in conjunction with a cooled electrode holder which consists of a single spoke or arm, provides views of the welding operation which are relatively unobstructed. Further, the beam splitter may be fitted with filters which block certain wavelengths of light. Still further, the beam splitter may be selected to reflect certain wavelengths while passing other wavelengths. This is a consideration when lasers are used to detect parameters of the weld pool.

SUMMARY OF THE INVENTION

In accordance with this invention, a robotic welding system is optically controlled by using a welding torch which provides a pair of through-the-torch views of the welding operation. One of these views is coupled to a weld pool contour detector, while the other view is coupled to a seam tracking detector. The weld pool contour detector and seam tracking detector are electrically coupled to a robotic welding apparatus, which guides the welding torch responsive to the views provided thereby.

BRIEF DESCRIPTION OF THE DRAWINGS

FIG. 2 is a sectional view taken along lines 2—2 of FIG. 1.

FIG. 3 is a sectional view taken along lines 3—3 of FIG. 2.

FIG. 6 is a through-the-torch view of the welding operation obtained from a beam splitter mounted to the welding torch.

DESCRIPTION OF THE PREFERRED EMBODIMENT

Figure 1:
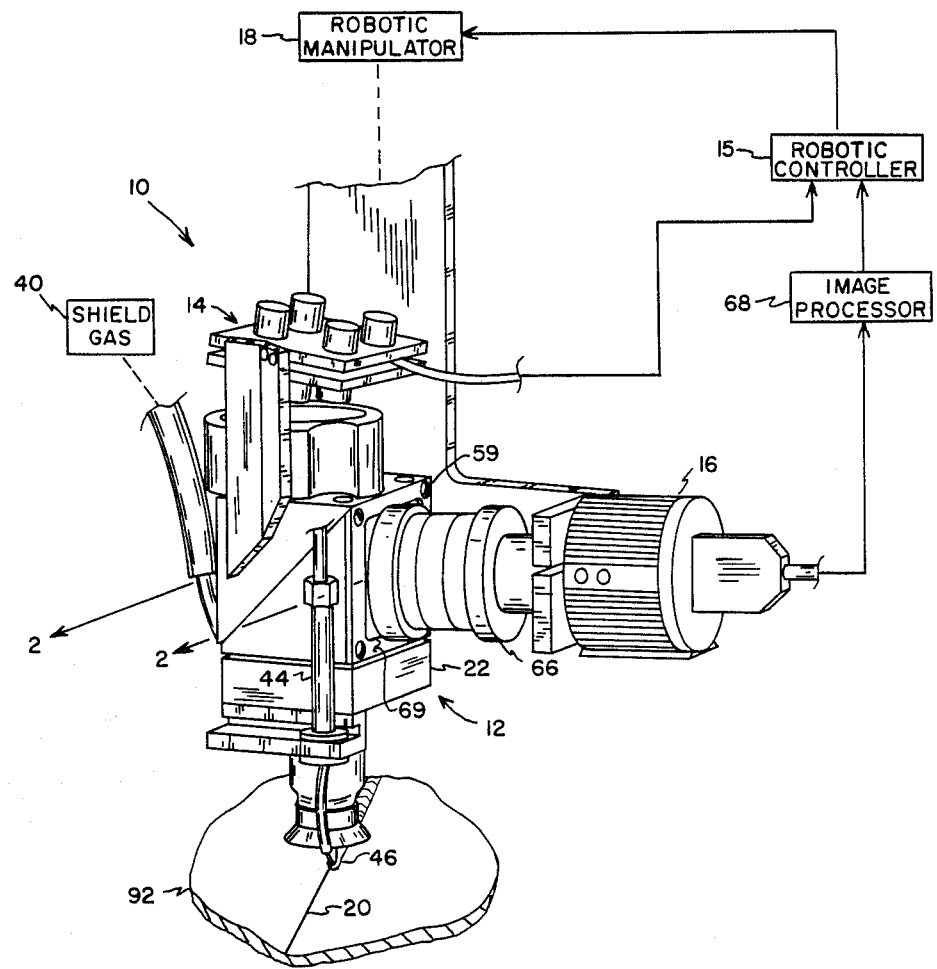
FIG. 1 is a partially pictorial, partially diagrammatic view of the present invention.

Referring to FIG. 1, a robotically controlled welding system 10 is diagrammatically shown which uses a welding torch assembly 12 that provides a pair of through-the-torch views of the welding process to a weld pool contour detector 14 and a seam tracking camera 16. The signal outputs of detector 14 and camera 16 are coupled to a robotic controller 15, which in turn provides inputs to a robotic manipulator 18 which holds and maneuvers torch assembly 12 over a seam 20 to be welded.

Referring to FIG. 2, torch assembly 12 consists of a body 22 having a central opening 24 extending therethrough, with an electrode holder 26 being disposed therein. Electrode holder 26 (FIGS. 3 and 6) is configured as a single spoke or arm 28 and serves to longitudinally support a welding electrode 30 in opening 24. For cooling electrode holder 26, bores 32 are constructed therein, with the bores approaching to within approximately 0.050" from electrode 30. A source 34 of coolant is coupled to one of bores 32 in torch body 22, with the other of bores 32 being coupled as a coolant return. This allows torch 12 to be operated continuously at high current densities (approximately 200 amps) without overheating. A gas cup 36 is mounted over opening 24 of side 38 of body 22, with welding electrode 30 extending therethrough in welding relation to seam 20. A source 40 of shield gas is coupled via channel 42 in body 22 to opening 24 to provide shield gas to the welding process via gas cup 36. A weld wire feed guide 44 (FIG. 1) is mounted to body 22 adjacent cup 36 and serves to guide welding wire to weld pool 46.

For providing views of the welding process, a beam splitter support housing 48 (FIG. 2) having a top window 50 and a side window 52 is mounted by means not shown over opening 24 on side 54 of torch body 22. A beam splitter 56 is angularly housed in housing assembly 48, with housing assembly 48 being diagonally separable into upper housing 55 and lower housing 57 by the removal of screws 58. Screws 58 clamp beam splitter 56 between upper and lower housings 55 and 57. Notches 61 are cut into upper and lower housings 55 and 57, with these notches together being a lesser width than the width of beam splitter 56. This allows a means of securing beam splitters which pass different wavelengths of light for customized use of torch 12. In a similar manner, a filter 70 (if used) is positioned in notches 63 of side window 52 and clamped into place by a filter clamp plate 69 and bolts 59. In the absence of a filter being used in side window 52, a plate of transparent material is clamped therein as described for a filter. This filter or plate, in conjunction with beam splitter 56, seals lower housing 57 against leakage of shield gas and ensures that all shield gas is directed out of torch 12 through gas cup 36.

The views provided by beam splitter 56 are coaxial with welding electrode 30 (FIG. 7), which allows electrode 30 to block the brightest light rays from the arc that otherwise may "wash out" portions of the view. One of these views is accessible through upper window 50 to be used by weld pool contour detector 14, while the reflected view is passed approximately 90° through side window 52 to seam tracking camera 16.

Figure 4:
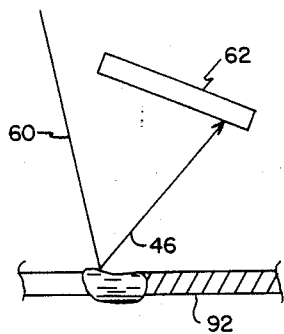
FIGS. 4 and 5 are diagrammatic views illustrating the principle of operation of a particular type of weld pool contour detector.
Figure 5:
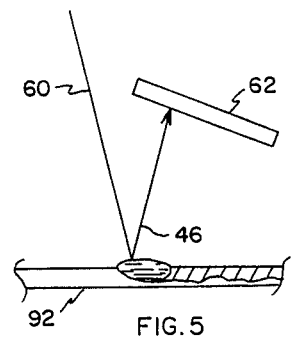

Weld pool contour monitor 14 is of the type disclosed in NASA Tech Brief MFS-29107, published March/April 1986, page 142, and which utilizes a 632 nm (nanometer) wavelength laser beam 60 and a two-axis laser position detector 62 (FIG. 2). In this type of weld pool contour detector, beam 60 is directed through the torch onto weld pool 46 where it is reflected to position detector 62. Depending on whether a weld is penetrated or unpenetrated (FIGS. 4 and 5, respectively), beam 60 is characteristically reflected to a predetermined position on position detector 62. Position detector 62 then provides signal inputs to robotic manipulator 18 via robotic controller 15 (FIG. 1), which adjusts the welding current or the rate of movement of torch 12 over seam 20 responsive to these inputs.

For detector 62 to work properly, it is necessary that beam splitter 56 pass laser beam 60 both to and from weld pool 46. In order to do this and still reflect a view of the welding process to seam tracking camera 16, beam splitter 56 is selected to transmit wavelengths through upper window 50 which are above 550 nm, while reflecting wavelengths below 550 nm. Thus, if beam 60 is selected to have a wavelength of approximately 632 nm, beam 60 may pass unaffected through beam splitter 56 in both directions.

Seam tracking camera 16 is a conventional camera manufactured by Fairchild (Model No. AM 3002) which utilizes a CCD (charge coupled device) video sensing element to produce a digital video signal comprised of pixels, with this digitized signal being representative of the welding image. This camera utilizes the below-550 nm wavelength view which is reflected through side window 52 from beam splitter 56, which in turn is directed through a lens 66 (FIG. 1) to camera 16. It is advantageous to use a CCD camera in order to digitize the image prior to processing by a digital image processor 68. Processor 68 is manufactured by Heurikon and is commonly known as a "Heurikon Real Time Processor." This processor is provided with software which locates weld seam 20 and provides a digital signal representative thereof to robotic controller 15. Robotic manipulator 18 is a conventional unit manufactured by Cybotech known as a Cybotech H80 and is constructed having an RC-7 robot controller 15 (FIG. 1), a welding gas management system (not shown), an IBM-PC user interface (not shown), and a Hobart welding power supply 90 (FIG. 2).

In operation, torch assembly 12 is prepared for use by selecting and mounting a beam splitter 56 in beam splitter assembly 48. As stated, it is anticipated that a beam splitter which transmits light above 550 nm and reflects below 550 nm is suitable for general use when laser beam 60 is selected to have a frequency above 550 nm. If desired, beam splitter 56 may be selected to pass and reflect different percentages of wavelengths of light exposed to detector 62 and camera 16. Additionally, a filter may be fitted into side window 52, preventing or limiting selected wavelengths of light from reaching camera 16. Torch assembly 12 is then mounted to robotic manipulator 18 and appropriate conventional couplings made to a welding power supply 90 (FIG. 2), such as source 34 of coolant, and a source 40 of shield gas. A welding electrode 30 is mounted in the opening of electrode holder 26 and adjusted to extend in welding relation through gas cup 36.

CCD camera 16 functions to observe the entire view obtained through torch 12. However, image processor 68 is provided with software that scans only region 21 (FIG. 6) approximately 0.25" ahead of electrode 30 which includes weld seam 20. Driven by this software, image processor 68 "looks" at pixel-by-pixel contrast changes in video line scans of region 21, and where they change is where seam 20 is expected to be. Processor 68 then delivers an electrical signal representative of the position of seam 20 to robotic manipulator 18 via controller 15 which positions electrode 30 over seam 20 to within 0.010" tolerance. After being electronically processed, these signals are used to control movements of robotic manipulator 18 as welder 12 traverses seam 20.

RC-7 controller 15, provided by Cybotech, is programmed to perform, among other functions, integration functions between communications, weld supervision, geometric operation, vision interfacing, and sensor control. As such, it performs a "traffic cop" function as determined by sets of priorities programmed into its software. As such, it accepts signals from image processor 68 and weld contour monitor 14 and integrates them with predetermined priorities to adjust welding parameters such as welding current, welding wire feed, position of electrode 30, welding voltage, and rate of welding.

From the foregoing, it is apparent that the applicants having provided a welding torch which provides a pair of through-the-torch views which are coaxial with the welding electrode. One of these views is coupled to a weld seam tracking detector, while the other view is coupled to a weld pool contour detector. These detectors are used to provide guidance instructions to a robotic manipulator gripping the welding torch and operate in a non-interfacing manner with respect to each other to provide an automated, real-time welding system.

I claim:

1. An automated welding system including a robotic manipulator disposed for movement along a predetermined path and optical control means for control of said robotic manipulator along said predetermined path and optical control means for control of said robotic manipulator along said predetermined path, comprising:

a welding torch body supported by said robotic manipulator and having a opening extending therethrough;

electrode support means disposed in said opening, for axially supporting a welding electrode therein so that said electrode extends in welding relation beyond one side of said torch body;

light reflectance and transmittance means, including a beam splitter, disposed on an opposite side of said torch body and over said opening, for providing first and second paths of light to and from said predetermined path, with said first and second paths of light being generally coaxial with said welding electrode;

weld pool contour detection means disposed to receive said first path of light, including a beam of light directed onto said weld pool and disposed to receive a reflected portion of said beam of light, for detecting contours of the weld pool and providing a first set of electrical signals representative thereof;

seam tracking means disposed to receive said second path of light, including an image processor for detecting the position of a seam to be welded and providing a second set of electrical signals representative thereof; and robotic manipulator control coupled to said robotic manipulator and said weld pool contour detection means and said seam tracking means, for receiving said first and second sets of signals and controlling movement of said welding torch responsive thereto, whereby said welding electrode is made to traverse the seam to be welded while achieving optimum penetration of the weld pool.

2. A welding system as set forth in claim 1 wherein said light reflectance and transmittance means comprises a partially reflective, partially transmittive beam splitter angularly disposed over said electrode so that a reflected view of the welding operation is directed approximately 90° with respect to said electrode, and a transmitted view of the welding operation is directed approximately coaxial with respect to said electrode.

3. A welding system as set forth in claim 2 wherein said beam splitter is disposed in a housing, with said housing being removably mounted to said body so that said beam splitter may be removed and another beam splitter having different optical properties substituted therefor.

4. A welding system as set forth in claim 3 wherein said beam splitter is selected to reflect wavelengths below approximately 550 nm and passes wavelengths above approximately 550 nm.

5. A welding system as set forth in claim 2 wherein said beam splitter includes a replaceable optical filter for passing selected wavelengths in at least one of said reflected and said transmitted views.

6. A welding system as set forth in claim 1 wherein said electrode holding means includes a single electrode mounting arm extending from an inner wall of said opening, with said arm having an end centrally positioned in said opening, said end being disposed for longitudinally holding said electrode in said opening, whereby a minimum of said first and second paths of light is blocked by said electrode and said electrode mounting arm.

7. A welding system as set forth in claim 6 wherein a coolant inlet and a coolant outlet are provided to said electrode mounting arm, said inlet and outlet being communicating relation with a source of coolant and a return of coolant, respectively, and at least one coolant channel being disposed in said mounting arm proximate to said electrode, allowing said electrode to be powered at high current for long periods of time.

8. A welding system as set forth in claim 1 comprising:
   a gas cup surrounding that portion of said electrode which extends beyond one side of said torch body; and
   a source of shield gas coupled to said welding torch and in communicating relation with said gas cup, for providing shield gas to the welding operation.

9. In an optically controlled welding system having a welding torch with through the torch welding capabilities and a robotic manipulator for controlling the movement of said welding torch relative to a predetermined path, a method of controlling the movement of said welding torch and quality of the resultant weld pool comprising the steps of:
   supporting an electrode near the center of said welding torch and in spaced relationship from the sides of said torch to create a line of sight opening between said electrode and said sides,
   directing a beam of light through said opening to intersect the longitudinal axis of said electrode and impinge on said weld pool, at least a portion of said beam returning back through said opening into said torch,
   splitting said return beam of light in at least first and second paths relative to the direction of said return beam,
   generating a first set of electrical signals in response to said split beam of light in said first path which is indicative of the contours of said weld pool,
   generating a second set of electrical signals in response to said split beam of light in said second path which is indicative of the position of said welding torch relative to said predetermined path, and
   generating command signals to said robotic manipulator in response to said first and second sets of electrical signals to control movement of said torch whereby said electrode is made to traverse said predetermined path in response to said second set of signals while at the same time achieving optimum penetration of said weld pool in response to said first set of signals.

10. The method of claim 9 wherein said step of generating a second set of electrical signals further includes filtering said split beam of light in said second path for passing selected wavelengths of light.

11. The method of claim 9 wherein said step of splitting said return beam of light in at least first and second paths consists of transmitting a portion of said return beam along said first path in a direction substantially parallel to said return beam, and reflecting the remainder of said return beam along said second path in a direction substantially perpendicular to said return beam.

12. The method of claim 9 wherein said step of generating a second set of electrical signals includes creating a video image of said weld pool for visual monitoring of the welding operation.

13. The method of claim 12 wherein said step of generating a second set of electrical signals includes digitizing said video image to electronically format said image and aid in generation of said command signals.

14. The method of claim 9 wherein said step of supporting said electrode within said welding torch includes cooling said electrode to permit operation of said torch for relatively long periods of time.

15. The method of claim 14 wherein said step of supporting said electrode within said welding torch further includes shielding said electrode in the vicinity of said weld pool with a gas during the welding operation.

16. In an optically controlled welding system having a welding torch with an electrode concentrically supported at the center thereof providing through the torch welding capabilities, a robotic manipulator for adjusting the position of said welding torch relative to a predetermined path, and control feedback circuitry for providing control signals to said robotic manipulator to direct the position adjustment of said welding torch, a means for providing multiple views of the resultant weld pool and corresponding signals to said control feedback circuitry comprising:
   means for directing a beam of light lengthwise through said welding torch between the sides of said torch and said electrode to impinge on said weld pool,
   means for receiving said beam impinging on said weld pool, said means including a means for splitting the received beam into at least two different directions,
   means responsive to the received beam split along a first direction to generate a first set of electrical signals representative of the contours of said weld pool and conduct said first set of signals to said control feedback circuitry, and means responsive to the received beam split along a second direction to generate a second set of electrical signals representative of the position of said welding torch relative to said predetermined path and conduct said second set of signals to said control feedback circuitry.

17. The welding system of claim 16 wherein said means responsive to the received beam split along a first direction includes a position detector to detect the degree of penetration of said weld pool.

18. The welding system of claim 16 wherein said means responsive to the received beam split along a second direction includes a camera to provide a video image of said weld pool and permit monitoring of the welding operation.

19. The welding system of claim 18 wherein said means responsive to the received beam split along a second direction further includes a removable filter means to pass only selected wavelengths of light to said camera.

20. The welding system of claim 18 wherein said means responsive to the received beam split along a second direction further includes a means for digitizing said video image into digital format suitable for use by said control feedback circuitry.

* * * * *